(12) United States Patent
Sakina et al.

(10) Patent No.: US 9,436,852 B2
(45) Date of Patent: Sep. 6, 2016

(54) TWO-DIMENSIONAL CODE AUTHENTICATING DEVICE, TWO-DIMENSIONAL CODE GENERATING DEVICE, TWO-DIMENSIONAL CODE AUTHENTICATING METHOD, AND PROGRAM

(75) Inventors: Ken-ichi Sakina, Tokyo (JP); Youichi Azuma, Tokyo (JP); Kishi Hideaki, Tokyo (JP)

(73) Assignee: A.T. Communications Co., LTD, Tokyo (JP)

( * ) Notice: Subject to any disclaimer, the term of this patent is extended or adjusted under 35 U.S.C. 154(b) by 0 days.

(21) Appl. No.: 13/984,221

(22) PCT Filed: Aug. 17, 2012

(86) PCT No.: PCT/JP2012/070938
§ 371 (c)(1),
(2), (4) Date: Mar. 31, 2015

(87) PCT Pub. No.: WO2014/027424
PCT Pub. Date: Feb. 20, 2014

(65) Prior Publication Data
US 2015/0199545 A1  Jul. 16, 2015

(51) Int. Cl.
*G06K 19/00* (2006.01)
*G06K 5/00* (2006.01)
*G06K 7/14* (2006.01)
*G06K 19/06* (2006.01)

(52) U.S. Cl.
CPC ............... *G06K 5/00* (2013.01); *G06K 7/1417* (2013.01); *G06K 7/1473* (2013.01); *G06K 19/06037* (2013.01); *G06K 19/06075* (2013.01)

(58) Field of Classification Search
USPC .......................... 235/435, 437, 439, 454, 462
See application file for complete search history.

(56) References Cited

U.S. PATENT DOCUMENTS

| | | |
|---|---|---|
| 5,726,435 A | 3/1998 | Hara et al. |
| 2005/0137986 A1* | 6/2005 | Kean ............... G06Q 20/327 705/65 |
| 2009/0212111 A1* | 8/2009 | Krichi .............. G06K 7/1417 235/462.11 |
| 2009/0323959 A1 | 12/2009 | Hara |

FOREIGN PATENT DOCUMENTS

| | | |
|---|---|---|
| EP | 0672994 A1 | 9/1995 |
| EP | 2000950 A1 | 12/2008 |
| JP | 07-254037 | 10/1995 |
| JP | 2006-318328 | 11/2006 |
| JP | 2007-042054 | 2/2007 |
| JP | 2008-299422 | 12/2008 |
| JP | 2009-099091 | 5/2009 |

* cited by examiner

*Primary Examiner* — Matthew Mikels
(74) *Attorney, Agent, or Firm* — K&L Gates, LLP; Louis Cullman; Robert Winn

(57) ABSTRACT

A two-dimensional code authenticating device reads a self-authentication two-dimensional code to obtain an RS bit string, and detects a bit string c' as an error using the RS bit string. Next, an exclusive OR between a bit string l included in the RS bit string and the bit string c' detected as an error is calculated to obtain a bit string c', and a bit string md is obtained by decrypting the bit string c' through a scheme corresponding to the encryption. Subsequently, it is determined whether or not the decrypted bit string md matches the bit string m included in the RS bit string, thereby authenticating the self-authentication two-dimensional code.

8 Claims, 6 Drawing Sheets

TWO-DIMENSIONAL CODE AUTHENTICATING DEVICE, TWO-DIMENSIONAL CODE GENERATING DEVICE, TWO-DIMENSIONAL CODE AUTHENTICATING METHOD, AND PROGRAM

TECHNICAL FIELD

The present invention relates to a two-dimensional code authenticating device, a two-dimensional code generating device, a two-dimensional code authenticating method, and a program, and more particularly, to a two-dimensional code authenticating device, a two-dimensional code generating device, a two-dimensional code authenticating method, and a program that can detect the falsification of a two-dimensional code.

BACKGROUND ART

QR (Quick Response) codes (a registered trademark) typical of a two-dimensional code are for putting machine-readable information into printed objects, and nowadays, the use of the QR codes with monetary values typical of airline tickets becomes widespread (see, for example, Patent Literature 1).

Note that the entire specification, claims, and drawings of Patent Literature 1 are herein incorporated in this specification by reference.

PRIOR ART LITERATURE

Patent Literature

Patent Literature 1: Unexamined Japanese Patent Application Kokai Publication No. 2006-318328

DISCLOSURE OF THE INVENTION

Problem to be Solved by the Invention

Hence, the development of a technology of detecting the falsification of a two-dimensional code typical of a QR code is an urgent task.

The present invention has been made in order to address the above-explained technical issue, and it is an objective of the present invention to provide a two-dimensional code authenticating device, a two-dimensional code generating device, a two-dimensional code authenticating method, and a program that can detect the falsification of a two-dimensional code.

Means for Solving the Problem

To accomplish the above object, a two-dimensional code authenticating device according to a first aspect of the present invention is a two-dimensional code authenticating device for authenticating a two-dimensional code including an information area expressing predetermined information by a distribution pattern of cells, and a correction area expressing correcting information for correcting an error by a distribution pattern of cells, the two-dimensional code authenticating device including: two-dimensional code reading means for reading the two-dimensional code having a portion of the correction area replaced with an exclusive OR between a first correction bit string generated from the portion and a second correction bit string generated from a different portion of the correction area to obtain the correcting information; error detecting means for detecting the exclusive OR between the first correction bit string and the second correction bit string as an error using the correcting information obtained by the two-dimensional code reading means; and two-dimensional code authenticating means for authenticating the two-dimensional code by determining whether or not an exclusive OR between the first correction bit string included in the correcting information and the error detected by the error detecting means matches the second correction bit string included in the correcting information.

Moreover, according to the above-explained two-dimensional code authenticating device, the two-dimensional code reading means may read the two-dimensional code having a portion of the correction area replaced with an exclusive OR between the first correction bit string and an encrypted bit string obtained by encrypting the second correction bit string to obtain the correcting information, and the two-dimensional code authenticating means may authenticate the two-dimensional code by determining whether or not a decrypted bit string obtained by decrypting the exclusive OR between the first correction bit string included in the correcting information and the error detected by the error detecting means through a scheme corresponding to the encryption matches the second correction bit string included in the correcting information.

To accomplish the above object, a two-dimensional code generating device according to a second aspect of the present invention is a two-dimensional code generating device that generates a two-dimensional code which can be authenticated by the two-dimensional code authenticating device according to claim 1, the two-dimensional code generating device including: a correction bit string obtaining means for obtaining the first correction bit string and the second correction bit string from the correction area; an exclusive OR calculating means for calculating an exclusive OR between the first correction bit string and the second correction bit string both obtained by the correction bit string obtaining means; and a two-dimensional code generating means for generating the two-dimensional code having the second correction bit string put into as authentication information by replacing a portion of the correction area with the exclusive OR calculated by the exclusive OR calculating means.

To accomplish the above object, a two-dimensional code generating device according to a third aspect of the present invention is a two-dimensional code generating device that generates the two-dimensional code which can be authenticated by the two-dimensional code authenticating device according to claim 2, the two-dimensional code generating device including: a correction bit string obtaining means for obtaining the first correction bit string and the second correction bit string from the correction area; encrypted bit string generating means for generating the encrypted bit string by encrypting the second correction bit string obtained by the correction bit string obtaining means; an exclusive OR calculating means for calculating an exclusive OR between the first correction bit string obtained by the correction bit string obtaining means and the encrypted bit string generated by the encrypted bit string generating means; and a two-dimensional code generating means for generating the two-dimensional code having the encrypted bit string put in as authentication information by replacing a portion of the correction area with the exclusive OR calculated by the exclusive OR calculating means.

According to the above-explained two-dimensional code generating device, the encrypted bit string generating means may encrypt the second correction bit string through asymmetric cryptography.

According to the above-explained two-dimensional code generating device, the encrypted bit string generating means may encrypt the second correction bit string through elliptic curve cryptography.

To accomplish the above object, a two-dimensional code authenticating method according to a fourth aspect of the present invention is a two-dimensional code authenticating method for authenticating a two-dimensional code including an information area expressing predetermined information by a distribution pattern of cells, and a correction area expressing correcting information for correcting an error by a distribution pattern of cells, the method including: a two-dimensional code reading step for reading the two-dimensional code having a portion of the correction area replaced with an exclusive OR between a first correction bit string generated from the portion and a second correction bit string generated from a different portion of the correction area to obtain the correcting information; an error detecting step for detecting the exclusive OR between the first correction bit string and the second correction bit string as an error using the correcting information obtained through the two-dimensional code reading step; and a two-dimensional code authenticating step for authenticating the two-dimensional code by determining whether or not an exclusive OR between the first correction bit string included in the correcting information and the error detected by the error detecting step matches the second correction bit string included in the correcting information.

To accomplish the above object, a program according to a fifth aspect of the present invention is a program that causes a computer of a two-dimensional code authenticating device for authenticating a two-dimensional code including an information area expressing predetermined information by a distribution pattern of cells, and a correction area expressing correcting information for correcting an error by a distribution pattern of cells to execute: a two-dimensional code reading process for reading the two-dimensional code having a portion of the correction area replaced with an exclusive OR between a first correction bit string generated from the portion and a second correction bit string generated from a different portion of the correction area to obtain the correcting information; an error detecting process for detecting the exclusive OR between the first correction bit string and the second correction bit string as an error using the correcting information obtained through the two-dimensional code reading process; and a two-dimensional code authenticating process for authenticating the two-dimensional code by determining whether or not an exclusive OR between the first correction bit string included in the correcting information and the error detected by the error detecting process matches the second correction bit string included in the correcting information.

Effects of the Invention

According to the present invention, a two-dimensional code authenticating device, a two-dimensional code generating device, a two-dimensional code authenticating method, and a program are provided which can detect the falsification of a two-dimensional code.

MODE FOR CARRYING OUT THE INVENTION

A detailed explanation will now be given of an embodiment of the present invention with reference to the drawings.

Figure 1:
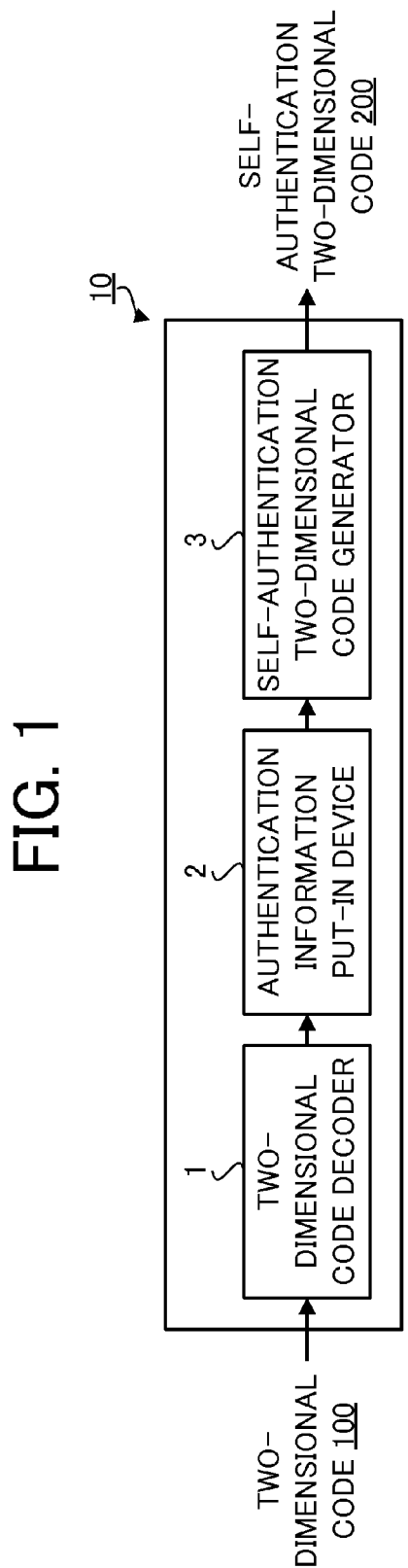
FIG. 1 is a block diagram illustrating an example configuration of a self-authentication two-dimensional code generating device.

FIG. 1 is a block diagram illustrating an example configuration of a self-authentication two-dimensional code generating device according to the present embodiment.

A self-authentication two-dimensional code generating device 10 puts authentication information into a two-dimensional code 100 that is a put-in target to generate a self-authentication two-dimensional code, and is realized by a general-purpose computer including, for example, a CPU (Central Processing Unit), a ROM (Read Only Memory), a RAM (Random Access Memory), and a hard disk drive.

Figure 2:
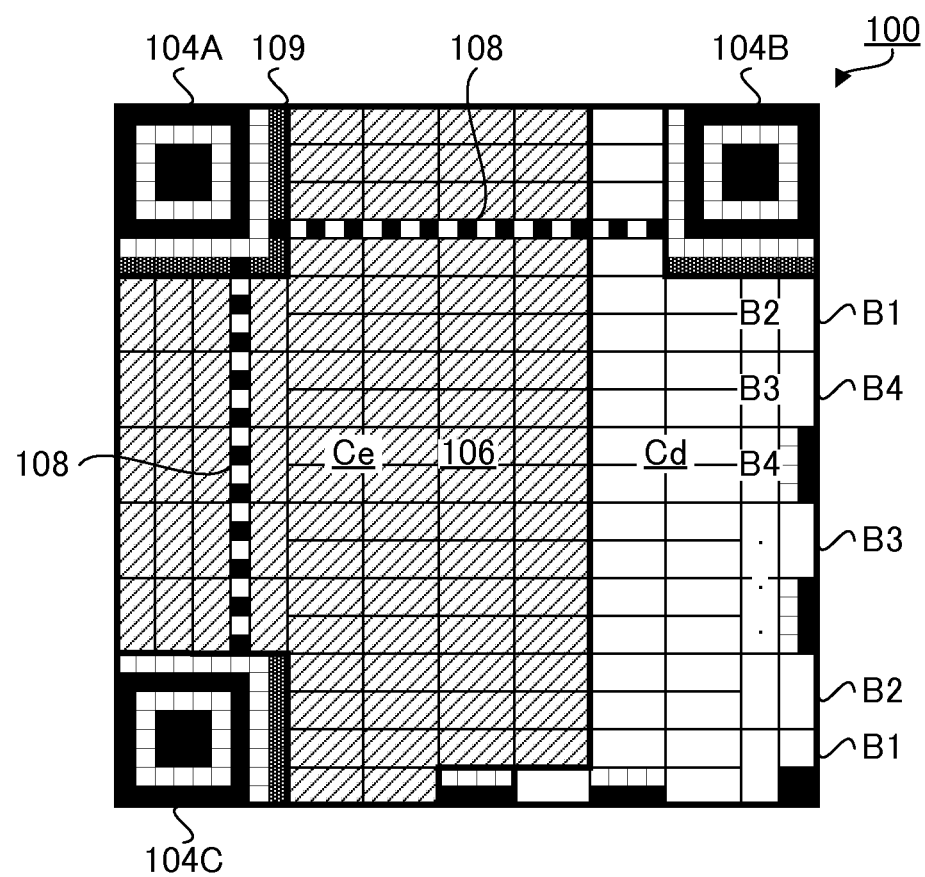
FIG. 2 is a diagram illustrating an example structure of a two-dimensional code.

FIG. 2 is a diagram illustrating an example structure of a two-dimensional code to be put in according to the present embodiment.

The two-dimensional code 100 meets the standard (JIS X 0510) of a so-called QR (Quick Response) code (a registered trademark, hereinafter the same), and, as illustrated in FIG. 2, includes three positioning symbols 104A, 104B, and 104C, an information code recording area 106, timing cells 108, a format code 109, or the like.

The three positioning symbols 104A, 104B, and 104C are respectively disposed at three vertices among the four vertices of the two-dimensional code 100 in a rectangular shape.

The timing cells 108 are disposed between the positioning symbols 104A, 104B, and 104C as a linear reference pattern of an alternation of white and black colors. Those timing cells 108 are used as an index of the position of each data cell.

The format code 109 is disposed near the positioning symbol 104A, and indicates version information defined in advance for the format of an information code recorded in the information code recording area 106. The version information in the standard of the two-dimensional code (QR code) includes a combination of versions 1 to 40 and four error correction levels L, M, Q, and H (becomes higher from L to H) of respective versions.

The versions 1 to 40 correspond to the total number of symbols configured by eight cells mainly compatible with 8 bits. Moreover, the error correction levels (L, M, Q, and H) correspond to the level of a rate of allowing unreadable symbols among all symbols, that is, the level of an allowable deficiency rate. The allowable deficiency rates of respective levels are as follows: the error correction level H is substantially 30%; the error correction level Q is substantially 25%; the error correction level M is substantially 15%; and the error correction level L is substantially 7%. The two-dimensional code 100 having the version 5 with the total number of symbols that is 134, and having the error correction level H is used in the present embodiment, and the version information is represented as "5-H". Note that the present invention is not limited to this case, and the version of the two-dimensional code and the error correction level thereof are optional, the version may be any one of the versions 1 to 40, and the error correction level may be any one of the error correction levels L, M, Q, and H.

The information code recording area 106 is configured by two kinds of cells (white and black patterns are omitted) having different optical characteristics, and includes a code pair of an information code (an information area) Cd and an RS (Reed-Solomon) code (a correction area) Ce corresponding thereto. The information code is encoded predetermined information, and expresses predetermined information by the distribution pattern (cell pattern) of cells included in the information code. Moreover, the RS code Ce is encoded correcting information obtained by encoding predetermined information with RS (Reed-Solomon), and expresses the correcting information for correcting an error by a cell pattern included in an RS code.

The present embodiment exemplifies an optimized example in which information is coded by the RS code, but the present invention is not limited to this case, and other coding schemes can be applied. For example, a BCH code or the like is suitably applicable to the present invention. Moreover, a Golay code, a Hadamard code, a Reed-Muller code, a low-density parity-check code, a Goppa code, a Fire code, a convolutional code, a turbo code, a concatenated code of a cyclic Hamming code and an RS code, and the like are applicable to the present invention.

The information code recording area 106 includes a total of 134 symbols which are 44 information symbols configuring the information code Cd and 90 RS symbols configuring the RS code Ce. The information code recording area 106 is divided into four blocks B1 to B4. The two blocks B1 and B2 among those are configured by a total of 33 symbols which are 11 information symbols and 22 RS symbols corresponding thereto, and the remaining two blocks B3 and B4 are configured by a total of 34 symbols which are 11 information symbols and 23 RS symbols corresponding thereto.

The self-authentication two-dimensional code generating device 10 illustrated in FIG. 1 includes a two-dimensional code decoder 1, an authentication information put-in device 2, and a self-authentication two-dimensional code generator 3. Those respective devices may be configured by exclusively hardware devices, or may be realized as functions of at least one processor based on a software program.

The two-dimensional code decoder 1 decodes and reads the two-dimensional code 100, and includes a light receiving element like a CCD (Charge Coupled Device) which captures the two-dimensional code 100. The two-dimensional code decoder 1 decodes each block of the two-dimensional code 100 in accordance with a code layout rule, thereby obtaining an information bit string including the 11 information symbols and an RS bit string including the 22 or 23 RS symbols from each block.

The authentication information put-in device 2 puts authentication information into an RS symbol string obtained by the two-dimensional code decoder 1. The authentication information put-in device 2 extracts 12 RS symbols from predetermined positions in the RS bit string of each block. Next, the authentication information put-in device 2 selects six preset symbols among the 12 extracted RS symbols, and obtains a bit string m (a second correction bit string) having a bit length of 192 formed by a total of 24 RS symbols in all four blocks. Moreover, the authentication information put-in device 2 obtains a bit string l (=l1+l2+l3+l4) (a first correction bit string) having a bit length of 192 formed by the remaining six symbols among the 12 extracted RS symbols from each block which are a total of 24 RS symbols in all four blocks.

The authentication information put-in device 2 encrypts the bit string m using elliptic curve cryptography (ECC: Elliptic Curve Cryptography), RSA (Rivest-Shamir-Adleman), AES (Advanced Encryption Standard) 192, or the like, and obtains a bit string c (an encrypted bit string). Note that the elliptic curve cryptography depends on a mathematical difficulty which is an elliptic curve discrete logarithm problem (ECDLP), and is strong in terms of an encryption since there is no algorithm for effectively solving the ECDLP. Moreover, according to the elliptic curve cryptography, the cryptographic strength of the RSA having a key length of 1024 bits can be realized by merely 160 bits, and the amount of time necessary for the process is short. Hence, it is most preferable to perform encryption using the elliptic curve cryptography.

The present embodiment exemplifies an optimized example in which the bit strings are encrypted using the elliptic curve cryptography, but the present invention is not limited to this case, and other encrypting schemes can be applied. Asymmetric cryptography (public key cryptography), such as an RSA cryptography or an ElGamal cryptography, is suitably applicable to the present invention. Moreover, an AES cryptography, a DES (Data Encryption Standard) cryptography or the like is applicable to the present invention.

The authentication information put-in device 2 divides the bit string c into four pieces in accordance with the number of the blocks to generate bit strings $c_i$ (i=1 to 4) and calculates respective exclusive ORs between the bit strings $c_i$ and bit strings $l_i$ (i=1 to 4) including the remaining six symbols among the 12 RS symbols extracted from each block to generate bit strings $c_i$ (i=1 to 4). Next, the authentication information put-in device 2 replaces the bit strings $l_i$ with the bit strings $c_i$, respectively, thereby putting in the bit string c as authentication information.

The self-authentication two-dimensional code generator 3 disposes the information bit string and the RS bit string into which the authentication information has been put by the authentication information put-in device 2 in accordance with the code layout rule of the original two-dimensional code 100, thereby generating a self-authentication two-dimensional code 200 having the authentication information put in a correction area. The self-authentication two-dimensional code 200 generated in this manner is output in a manner printed by a printer, or displayed on LCD (Liquid Crystal Display), or the like.

Figure 3:
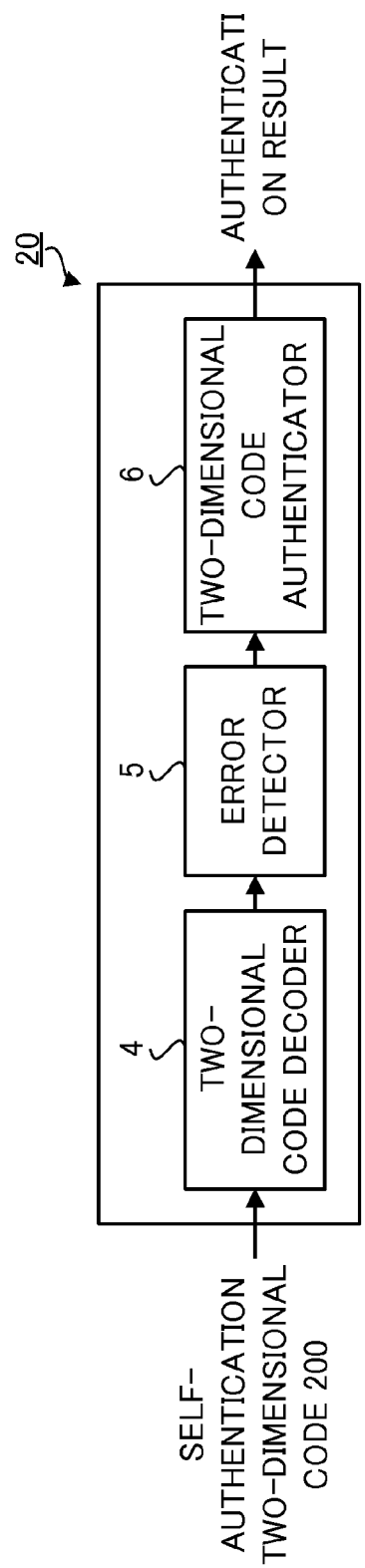
FIG. 3 is a block diagram illustrating an example configuration of a two-dimensional code authenticating device.

FIG. 3 is a block diagram illustrating an example configuration of a two-dimensional code authenticating device according to the present embodiment.

A two-dimensional code authenticating device 20 determines whether or not the self-authentication two-dimensional code 200 is falsified based on the authentication information put in the self-authentication two-dimensional code 200, and is realized by a general-purpose computer including a CPU, a ROM, a RAM, a hard disk drive, and the like similar to the self-authentication two-dimensional code generating device 10.

As illustrated in FIG. 3, the two-dimensional code authenticating device 20 includes a two-dimensional code decoder 4, an error detector 5, and a two-dimensional code authenticator 6. Those respective devices may be configured by exclusive hardware devices, or may be realized as functions of at least one processor based on a software program.

The two-dimensional code decoder 4 decodes and reads the self-authentication two-dimensional code 200 like the above-explained two-dimensional code decoder 1, and includes a light receiving element like a CCD which captures the self-authentication two-dimensional code 200. The two-dimensional code decoder 4 decodes each block of the self-authentication two-dimensional code 200 in accordance with the above-explained code layout rule, thereby obtaining an information bit string including 11 information symbols and an RS bit string including 22 or 23 RS symbols from each block.

The error detector 5 detects an error in the self-authentication two-dimensional code 200 using the RS bit string (correcting information) of the self-authentication two-dimensional code 200. According to the present embodiment, the error detector 5 calculates an exclusive OR between data before decoded by the two-dimensional code decoder 4 and data after decoded by the two-dimensional code decoder 4, thereby detecting a bit string c' including 24 RS symbols as an error.

The two-dimensional code authenticator 6 authenticates the self-authentication two-dimensional code 200 using the bit string l and the bit string m both included in the RS bit string obtained by the two-dimensional code decoder 4 and the bit string c' detected as an error by the error detector 5, thereby determining whether or not the self-authentication two-dimensional code 200 is falsified. More specifically, the two-dimensional code authenticator 6 calculates an exclusive OR between the bit string l included in the RS bit string and the bit string c' detected as an error, thereby obtaining the bit string c' put in as authentication information.

The two-dimensional code authenticator 6 decrypts the bit string c' using a decryption key corresponding to the encryption by the authentication information put-in device 2, thereby obtaining a bit string md (a decrypted bit string). Next, the two-dimensional code authenticator 6 determines whether or not the decrypted bit string md matches the bit string m included in the RS bit string, thereby authenticating the self-authentication two-dimensional code 200.

The two-dimensional code authenticator 6 determines that the self-authentication two-dimensional code 200 is not falsified when the bit string md matches the bit string m upon the authentication, and determines that the self-authentication two-dimensional code 200 is falsified when the bit string md does not match the bit string m.

Next, an explanation will be given of operations of the self-authentication two-dimensional code generating device 10 and two-dimensional code authenticating device 20 employing the above-explained configuration with reference to the drawings.

Figure 4:
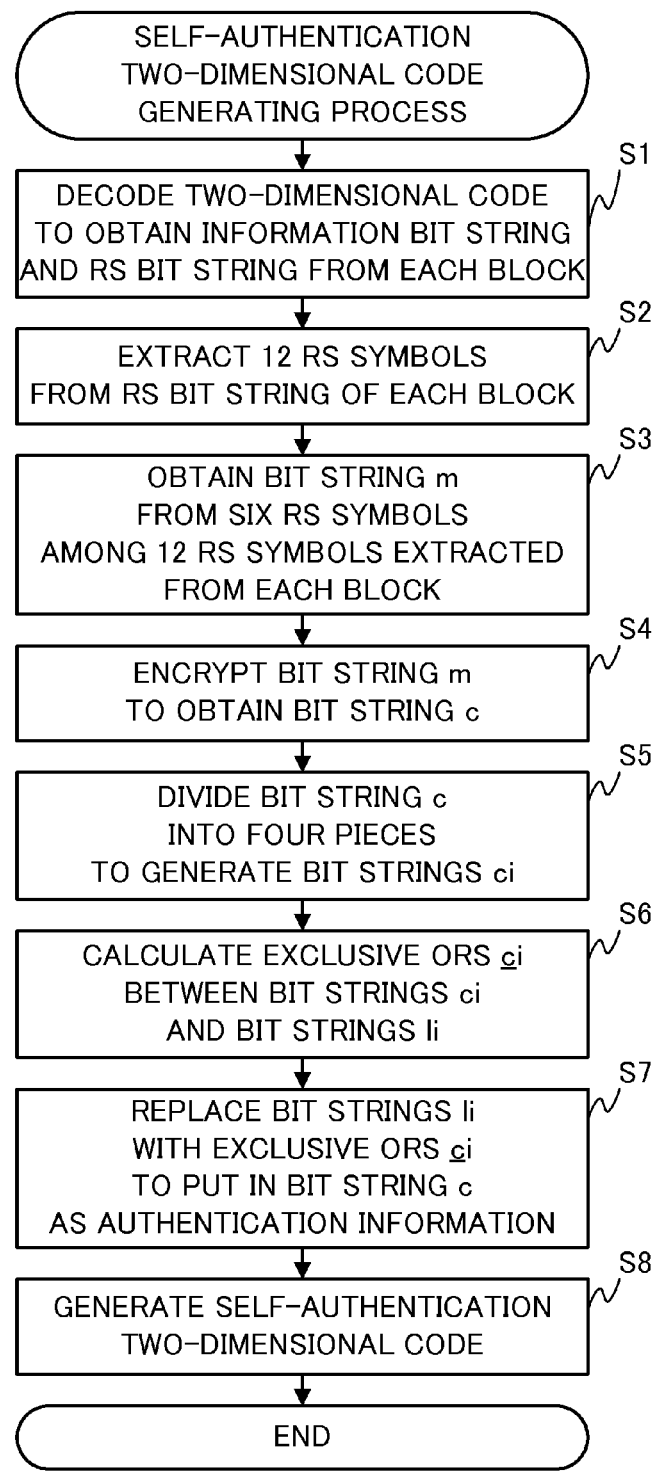
FIG. 4 is a flowchart illustrating the detail of a self-authentication two-dimensional code generating process.

FIG. 4 is a flowchart illustrating the detail of a self-authentication two-dimensional code generating process executed by the self-authentication two-dimensional code generating device.

The self-authentication two-dimensional code generating device 10 starts the self-authentication two-dimensional code generating process illustrated in FIG. 4 in response to the reading of the put-in-target two-dimensional code 100 by the two-dimensional code decoder 1. In the self-authentication two-dimensional code generating process, first, the self-authentication two-dimensional code generating device 10 causes the two-dimensional code decoder 1 to decode each block of the captured two-dimensional code 100 in accordance with the predetermined code layout rule, thereby obtaining the information bit string including the 11 information symbols and the RS bit string including the 22 or 23 RS symbols from each block (step S1).

Next, the self-authentication two-dimensional code generating device 10 causes the authentication information put-in device 2 to extract the 12 RS symbols from the predetermined positions in the RS bit string of each block (step S2). Subsequently, the self-authentication two-dimensional code generating device 10 causes the authentication information put-in device 2 to select the six preset symbols among the 12 extracted RS symbols, and to obtain the bit string m having the bit length of 192 formed by the total of 24 RS symbols in all four blocks (step S3).

Figure 5:
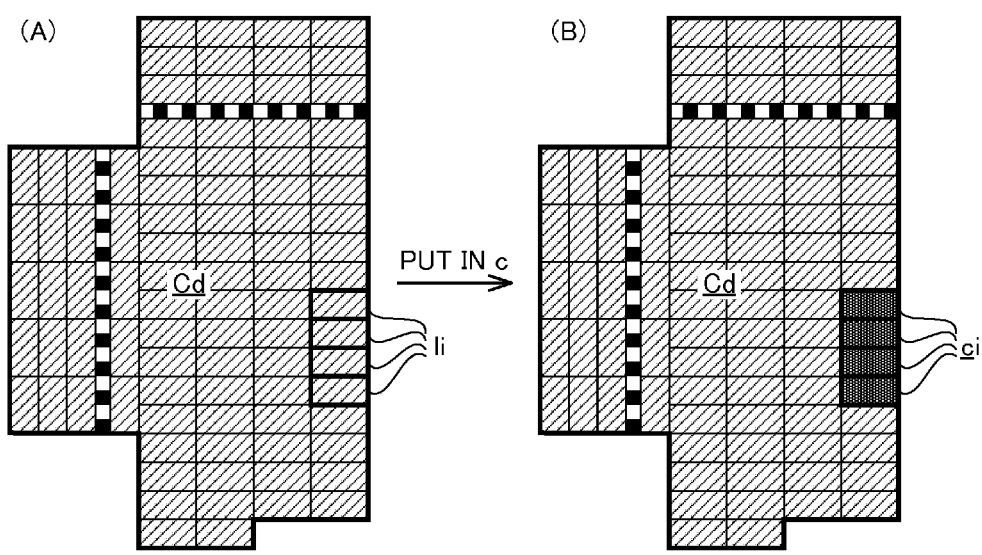
FIGS. 5A and 5B are exemplary diagrams for explaining a put-in procedure of authentication information.

The self-authentication two-dimensional code generating device 10 causes the authentication information put-in device 2 to encrypt the bit string m using the elliptic curve cryptography, and to obtain the bit string c (step S4). Next, the self-authentication two-dimensional code generating device 10 causes the authentication information put-in device 2 to divide the bit string c into four pieces in accordance with the number of the blocks, and to generate the bit strings ci (i=1 to 4) (step S5). Subsequently, the self-authentication two-dimensional code generating device 10 causes the authentication information put-in device 2 to calculate respective exclusive ORs between the bit strings ci (i=1 to 4) and the bit strings li (i=1 to 4) including the remaining six symbols among the 12 RS symbols extracted from each block, and to generate the bit strings ci (i=1 to 4) (step S6). For example, as illustrated in FIGS. 5A and B, the self-authentication two-dimensional code generating device 10 causes the authentication information put-in device 2 to replace the bit strings li with the bit strings ci, respectively, thereby putting in the bit string c as the authentication information (step S7).

Subsequently, the self-authentication two-dimensional code generating device 10 causes the self-authentication two-dimensional code generator 3 to dispose the information bit string and the RS bit string in which the authentication information is put by the authentication information put-in device 2 in accordance with the code layout rule of the original two-dimensional code 100, thereby generating and outputting the self-authentication two-dimensional code 200 having the authentication information put in the correction area (step S8).

Figure 6:
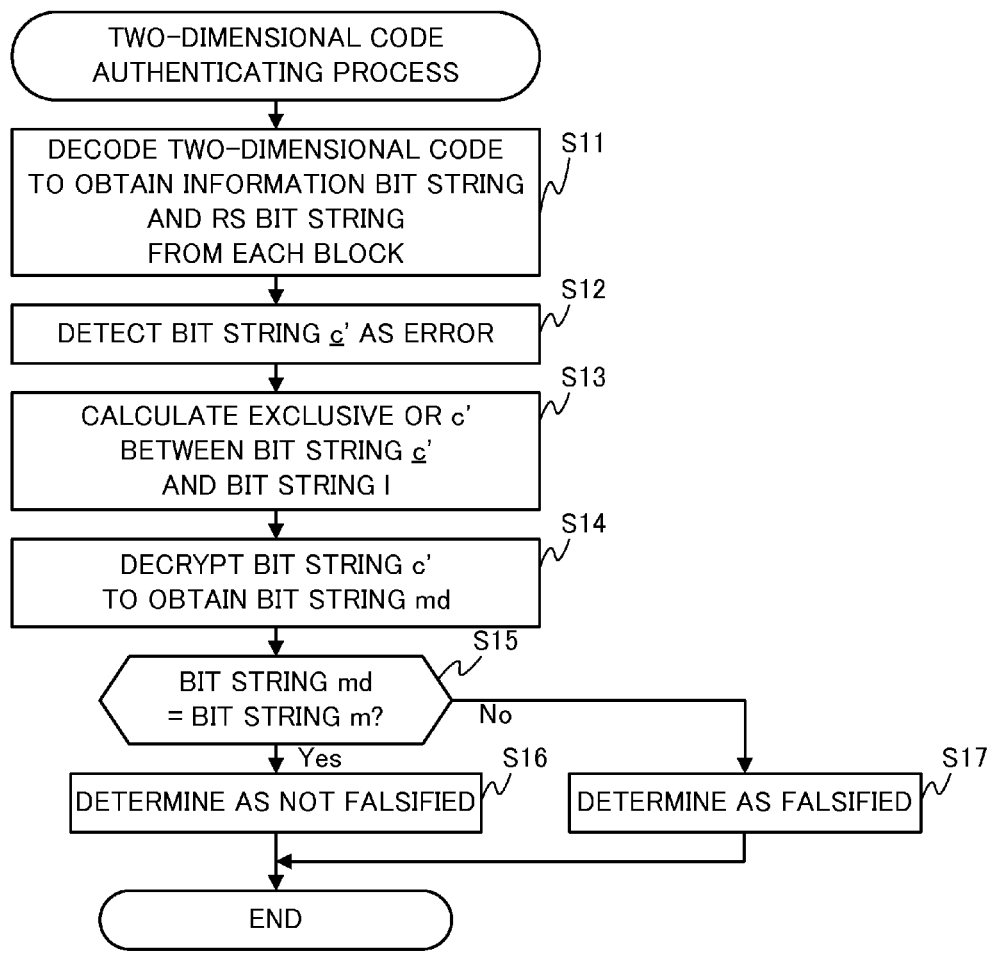
FIG. 6 is a flowchart illustrating the detail of a two-dimensional code authenticating process.

FIG. 6 is a flowchart illustrating the detail of a two-dimensional code authenticating process executed by the two-dimensional code authenticating device.

The two-dimensional code authenticating device 20 starts the two-dimensional code authenticating process illustrated in FIG. 6 in response to the reading of the self-authentication two-dimensional code 200 by the two-dimensional code decoder 4. In the two-dimensional code authenticating process, first, the two-dimensional code authenticating device 20 causes the two-dimensional code decoder 4 to decode each block of the captured self-authentication two-dimensional code 200 in accordance with the above-explained code layout rule, thereby obtaining the information bit string including the 11 information symbols and the RS bit string including the 22 or 23 RS symbols from each block (step S11).

Next, the two-dimensional code authenticating device 20 causes the error detector 5 to calculate the exclusive OR between the data before decoded by the two-dimensional code decoder 4 and the data after decoded by the two-dimensional code decoder 4, thereby detecting the bit string c' including the 24 RS symbols as an error (step S12).

Subsequently, the two-dimensional code authenticating device 20 causes the two-dimensional code authenticator 6 to calculate the exclusive OR between the bit string l included in the RS bit string and the bit string c' detected as an error, thereby obtaining the bit string c' put in as the authentication information (step S13).

Moreover, the two-dimensional code authenticating device 20 causes the two-dimensional code authenticator 6 to decrypt the bit string c' using the decryption key corresponding to the encryption by the authentication information put-in device 2, thereby obtaining the bit string md (step S14).

The two-dimensional code authenticating device 20 causes the two-dimensional code authenticator 6 to determine whether or not the decrypted bit string md matches the bit string m included in the RS bit string, thereby authenticating the self-authentication two-dimensional code 200 (step S15).

The two-dimensional code authenticator 6 determines that the self-authentication two-dimensional code 200 is not falsified when the bit string md matches the bit string m (step S15: Yes) upon the authentication (step S16), and determines that the self-authentication two-dimensional code 200 is falsified (step S17) when the bit string md does not match the bit string m (step S15: No).

As explained above, first, the self-authentication two-dimensional code generating device 10 according to the present embodiment causes the two-dimensional code decoder 1 to read the two-dimensional code including the information code Cd expressing the predetermined information by the distribution pattern of the cells, and the RS code Ce expressing the correcting information by the distribution pattern of the cells for correcting the error in the read information and for obtaining predetermined information.

Next, the self-authentication two-dimensional code generating device 10 causes the authentication information put-in device 2 to generate the bit string l and the bit string m from the RS code Ce, and encrypts the bit string m to generate the bit string c. Subsequently, the self-authentication two-dimensional code generating device 10 causes the authentication information put-in device 2 to calculate respective exclusive ORs between the bit strings ci obtained by dividing the bit string c into four pieces and the bit strings li to generate the bit strings ci. The self-authentication two-dimensional code generating device 10 causes the authentication information put-in device 2 to replace the bit strings li with the bit strings ci, thereby putting the bit string c into the RS code Ce as the authentication information.

Finally, the self-authentication two-dimensional code generating device 10 causes the self-authentication two-dimensional code generator 3 to generate the self-authentication two-dimensional code including the information bit string, and the RS bit string having the authentication information put therein by the authentication information put-in device 2.

Conversely, the two-dimensional code authenticating device 20 causes the two-dimensional code decoder 4 to read the self-authentication two-dimensional code 200 to obtain the RS bit string, and causes the error detector 5 to detect the bit string c' as an error using the RS bit string.

Next, the two-dimensional code authenticating device 20 causes the two-dimensional code authenticator 6 to calculate the exclusive OR between the bit string l included in the RS bit string and the bit string c' detected as an error to obtain the bit string c' put in as the authentication information, and to decrypt the bit string c' through a scheme corresponding to the encryption to obtain the bit string md. The two-dimensional code authenticating device 20 causes the two-dimensional code authenticator 6 to determine whether or not the decrypted bit string md matches the bit string m included in the RS bit string, thereby authenticating the self-authentication two-dimensional code 200.

As explained above, the self-authentication two-dimensional code generating device 10 according to the present embodiment calculates an exclusive OR between the bit string c obtained by encrypting the bit string m generated from a part of the RS code Ce and the bit string l generated from a different part from the former part of the RS code Ce to obtain the bit string c, and replaces the bit string l with the bit string c, thereby putting the bit string c into the RS code Ce as the authentication information. Hence, when the two-dimensional code is falsified, since the two-dimensional code authenticating device 20 becomes unable to detect the exclusive OR between the bit string c and the bit string l as an error, the falsification of the two-dimensional code can be detected.

Moreover, since it becomes unnecessary to make any changes in the information code Cd expressing the predetermined information by putting the authentication information into the RS code Ce, a reduction of the data amount of the information expressed by the two-dimensional code can be avoided.

Furthermore, since the bit string c obtained by encrypting the bit string m is put into the RS code Ce as the authentication information, the falsification of the two-dimensional code can be prevented further effectively.

Note that the present invention is not limited to the above-explained embodiment, and various changes and modifications can be made. An explanation will be below given of modified examples of the above-explained embodiment applicable to the present invention.

According to the above-explained embodiment, the explanation was given of the case in which the self-authentication two-dimensional code generating device 10 encrypts the bit string m to generate the bit string c, and calculates the exclusive OR between the bit string c and the bit string l. The present invention is, however, not limited to this case, and an exclusive OR between the bit string m and the bit string l may be calculated without encrypting the bit string m. In this case, the self-authentication two-dimensional code generating device 10 causes the authentication information put-in device 2 to calculate respective exclusive ORs between bit strings mi obtained by dividing the bit string m into four pieces and the bit strings li to generate bit strings mi. Next, the self-authentication two-dimensional code generating device 10 can cause the authentication information put-in device 2 to put in the bit string m into the RS code Ce as authentication information by replacing the bit strings li with the bit strings mi.

Conversely, the two-dimensional code authenticating device 20 causes the error detector 5 to detect a bit string m' as an error using the RS bit string. Next, the two-dimensional code authenticating device 20 can cause the two-dimensional code authenticator 6 to authenticate the self-authentication two-dimensional code 200 by calculating an exclusive OR between the bit string l included in the RS bit string and the bit string m' detected as an error to obtain a bit string m', and by determining whether or not the obtained bit string m' matches the bit string m included in the RS bit string.

According to the above-explained embodiment, the explanation was given of the structure in which the two-dimensional code 100 and the self-authentication two-dimensional code are formed of the white and black cells. The present invention is, however, not limited to this structure, a structure is optionally applicable as long as predetermined information is expressed using at least one color having an optical characteristic recognizable as "0" by a general-purpose two-dimensional code reader and at least one color having an optical characteristic recognizable as "1", and for example, a two-dimensional code with a visible logo superimposed thereon may be applicable. For example, a logo of lower than predetermined intensity (intensity recognized as "0" by a general-purpose two-dimensional code reader) may have cells of equal to or higher than the predetermined intensity (intensity recognized as "1" by the general-purpose two-dimensional code reader) superimposed thereon, and predetermined information may be expressed by the distribution pattern of portions on which no cell is superimposed on the logo and the cells (see, for example, Unexamined Japanese Patent Application Kokai Publication No. 2007-287004). Alternatively, a logo may have cell dots of lower than predetermined intensity superimposed on portions of equal to or higher than the predetermined intensity of the logo, while cell dots of equal to or higher than the predetermined intensity may be superimposed on portions of lower than the predetermined intensity of the logo, and predetermined information may be expressed by the distribution pattern of the cell dots of equal to or higher than the predetermined intensity and the portions of equal to or higher than the predetermined intensity of the logo, and the cell dots of lower than the predetermined intensity and the portions of lower than the predetermined intensity of the logo (see, for example, Unexamined Japanese Patent Application Kokai Publication No. 2008-15642). The entire specification, claims, and drawings of Unexamined Japanese Patent Application Kokai Publication No. 2007-287004 and Unexamined Japanese Patent Application Kokai Publication No. 2008-15642 are herein incorporated in this specification by reference.

According to the above-explained embodiment, the explanation was given of an example case in which the QR code (registered trademark) is the two-dimensional code, but the present invention is not limited to this case, and the two-dimensional code may be other matrix codes, such as a Data Matrix, an Aztec Code, a Code 1, an array tag, a Box Figure Code, a MaxiCode, a Pericode, a soft strip, a CP Code, a Karura Code and an Ultracode. Alternatively, a stacked two-dimensional code may be applicable which has one-dimensional bar codes, such as a PDF 417, a Code 49, a Code 16k, and a coder block, stacked together in the vertical direction.

Moreover, according to the above-explained embodiment, the explanation was given of the case in which the programs executed by the CPUs of the self-authentication two-dimensional code device 10 and the two-dimensional code authenticating device 20 are stored in a ROM or the like in advance, but the present invention is not limited to this case, and a program for realizing the above-explained processes may be applied to an already-existing general-purpose computer to cause such a computer to function as the self-authentication two-dimensional code device 10 and the two-dimensional code authenticating device 20 according to the above-explained embodiment.

A method for providing such a program is optional, and for example, the program may be distributed in a manner stored in a computer-readable recording medium (for example, a flexible disk, a CD (Compact Disc) ROM, or a DVD (Digital Versatile Disc) ROM), or may be stored in a storage device over a network like the Internet, and may be provided through a download.

Furthermore, when the above-explained processes are shared by an OS and an application program or are executed by cooperative operations of the OS and the application program, only the application program may be stored in a recording medium or a storage device. Still further, a program can be superimposed on carrier waves, and can be delivered through the network. For example, the above-explained program may be posted on a bulletin board system (BBS: Bulletin Board System) over the network, and may be delivered through the network. When the general-purpose computer may run the program, and run such a program like other application programs under the control of the OS, the above-explained processes can be executed.

The present invention can be carried out in various embodiments and changed and modified in various forms without departing from the broadest spirit and scope of the present invention. Moreover, the above-explained embodiment is to explain an embodiment of the present invention, and is not to limit the scope of the present invention.

DESCRIPTION OF REFERENCE NUMERALS

1 Two-dimensional code decoder
2 Authentication information put-in device
3 Self-authentication two-dimensional code generator
4 Two-dimensional code decoder
5 Error detector
6 Two-dimensional code authenticator
10 Self-authentication two-dimensional code generating device
20 Two-dimensional code authenticating device
100 Two-dimensional code
200 Self-authentication two-dimensional code

The invention claimed is:

1. A two-dimensional code authenticating device for authenticating a two-dimensional code comprising an information area expressing predetermined information by a distribution pattern of cells and a correction area expressing correcting information for correcting an error by a distribution pattern of cells, the two-dimensional code authenticating device comprising:
   two-dimensional code reading means for reading the two-dimensional code, wherein the two-dimensional code includes a portion of the correction area comprising the output of an exclusive OR between a first correction bit string generated from the portion and a second correction bit string generated from a different portion of the correction area to obtain the correcting information;
   error detecting means for detecting the output of exclusive OR between the first correction bit string and the second correction bit string as an error using the correcting information obtained by the two-dimensional code reading means; and
   two-dimensional code authenticating means for authenticating the two-dimensional code by determining whether or not an exclusive OR between the first correction bit string included in the correcting information and the error detected by the error detecting means matches the second correction bit string included in the correcting information.

2. The two-dimensional code authenticating device according to claim 1, wherein
   the two-dimensional code reading means reads the two-dimensional code having a portion of the correction area replaced with an exclusive OR between the first correction bit string and an encrypted bit string obtained by encrypting the second correction bit string to obtain the correcting information, and
   the two-dimensional code authenticating means authenticates the two-dimensional code by determining whether or not a decrypted bit string obtained by decrypting the exclusive OR between the first correction bit string included in the correcting information and the error detected by the error detecting means through a scheme corresponding to the encryption matches the second correction bit string included in the correcting information.

3. A two-dimensional code generating device that generates the two-dimensional code which can be authenticated by the two-dimensional code authenticating device according to claim 1, the two-dimensional code generating device comprising:

correction bit string obtaining means for obtaining the first correction bit string and the second correction bit string from the correction area;

exclusive OR calculating means for calculating an exclusive OR between the first correction bit string and the second correction bit string both obtained by the correction bit string obtaining means; and two-dimensional code generating means for generating the two-dimensional code having the second correction bit string put in as authentication information by replacing a portion of the correction area with the exclusive OR calculated by the exclusive OR calculating means.

4. A two-dimensional code generating device that generates the two-dimensional code which can be authenticated by the two-dimensional code authenticating device according to claim 2, the two-dimensional code generating device comprising:

correction bit string obtaining means for obtaining the first correction bit string and the second correction bit string from the correction area;

encrypted bit string generating means for generating the encrypted bit string by encrypting the second correction bit string obtained by the correction bit string obtaining means;

exclusive OR calculating means for calculating an exclusive OR between the first correction bit string obtained by the correction bit string obtaining means and the encrypted bit string generated by the encrypted bit string generating means; and two-dimensional code generating means for generating the two-dimensional code having the encrypted bit string put in as authentication information by replacing a portion of the correction area with the exclusive OR calculated by the exclusive OR calculating means.

5. The two-dimensional code generating device according to claim 4, wherein the encrypted bit string generating means encrypts the second correction bit string through asymmetric cryptography.

6. The two-dimensional code generating device according to claim 5, wherein the encrypted bit string generating means encrypts the second correction bit string through elliptic curve cryptography.

7. A two-dimensional code authenticating method for authenticating a two-dimensional code comprising an information area expressing predetermined information by a distribution pattern of cells, and a correction area expressing correcting information for correcting an error by a distribution pattern of cells, the method comprising:

a two-dimensional code reading step for reading the two-dimensional code having a portion of the correction area replaced with an exclusive OR between a first correction bit string generated from the portion and a second correction bit string generated from a different portion of the correction area to obtain the correcting information;

an error detecting step for detecting the exclusive OR between the first correction bit string and the second correction bit string as an error using the correcting information obtained through the two-dimensional code reading step; and a two-dimensional code authenticating step for authenticating the two-dimensional code by determining whether or not an exclusive OR between the first correction bit string included in the correcting information and the error detected by the error detecting step matches the second correction bit string included in the correcting information.

8. A program that causes a computer of a two-dimensional code authenticating device for authenticating a two-dimensional code comprising an information area expressing predetermined information by a distribution pattern of cells, and a correction area expressing correcting information for correcting an error by a distribution pattern of cells to execute:

a two-dimensional code reading process for reading the two-dimensional code having a portion of the correction area replaced with an exclusive OR between a first correction bit string generated from the portion and a second correction bit string generated from a different portion of the correction area to obtain the correcting information;

an error detecting process for detecting the exclusive OR between the first correction bit string and the second correction bit string as an error using the correcting information obtained through the two-dimensional code reading process; and a two-dimensional code authenticating process for authenticating the two-dimensional code by determining whether or not an exclusive OR between the first correction bit string included in the correcting information and the error detected by the error detecting process matches the second correction bit string included in the correcting information.

* * * * *